(12) United States Patent
McMillan

(10) Patent No.: US 9,097,139 B2
(45) Date of Patent: Aug. 4, 2015

(54) CONTAINMENT CASING

(75) Inventor: Alison J. McMillan, Uttoxeter (GB)

(73) Assignee: ROLLS-ROYCE plc, London (GB)

( * ) Notice: Subject to any disclaimer, the term of this patent is extended or adjusted under 35 U.S.C. 154(b) by 541 days.

(21) Appl. No.: 13/037,800

(22) Filed: Mar. 1, 2011

(65) Prior Publication Data
US 2011/0217156 A1 Sep. 8, 2011

(30) Foreign Application Priority Data
Mar. 5, 2010 (GB) .................................. 1003634.1

(51) Int. Cl.
*F01D 25/24* (2006.01)
*F01D 21/04* (2006.01)
*F02K 3/06* (2006.01)

(52) U.S. Cl.
CPC ................ *F01D 21/045* (2013.01); *F02K 3/06* (2013.01); *Y02T 50/672* (2013.01)

(58) Field of Classification Search
CPC ............................ F01D 21/045; Y02T 50/672
USPC ................ 415/9, 173.4, 174.4, 196, 197, 200
See application file for complete search history.

(56) References Cited

U.S. PATENT DOCUMENTS

| 2,574,190 | A | | 11/1951 | New |
| 4,425,080 | A | * | 1/1984 | Stanton et al. ................. 415/197 |
| 4,452,335 | A | * | 6/1984 | Mathews et al. .............. 181/214 |
| 4,466,772 | A | * | 8/1984 | Okapuu et al. ............. 415/173.5 |
| 4,547,122 | A | * | 10/1985 | Leech ................................. 415/9 |
| 6,532,857 | B1 | | 3/2003 | Shih et al. |
| 6,913,436 | B2 | * | 7/2005 | McMillan et al. ................. 415/9 |
| 7,114,912 | B2 | * | 10/2006 | Gerez et al. ........................ 415/9 |
| 7,766,603 | B2 | * | 8/2010 | Beckford et al. ................. 415/9 |
| 7,914,251 | B2 | * | 3/2011 | Pool et al. ......................... 415/9 |
| 8,757,958 | B2 | * | 6/2014 | Lussier .............................. 415/9 |

FOREIGN PATENT DOCUMENTS

WO   WO 2006/038859 A1   4/2006

OTHER PUBLICATIONS

British Search Report dated May 20, 2010 issued in British Patent Application No. 1003634.1.

* cited by examiner

*Primary Examiner* — Nathaniel Wiehe
*Assistant Examiner* — Woody A Lee, Jr.
(74) *Attorney, Agent, or Firm* — Patrick A. Gildea

(57) ABSTRACT

A containment casing is provided comprising a radially outer layer; an intermediate energy absorbing layer, and a retention framework for retaining an aerofoil blade in the event of detachment of whole or part of the blade. The retention framework is distributed axially and circumferentially along the casing and extends substantially radially inwardly at least partially through the intermediate energy absorbing layer.

17 Claims, 4 Drawing Sheets

CONTAINMENT CASING

The present invention relates to containment casings for rotary machinery and particularly to the containment of blades in rotating machinery. The present invention has particular application to containment casings for fans and turbines of gas turbine engines.

Gas turbine engines for powering aircraft conventionally comprise a core engine and an additional propulsive fan. The fan is driven by a turbine which may be one of a number of turbines contained within the core engine. The fan comprises a series of radially extending fan blades mounted on a fan rotor and enclosed by a generally cylindrical fan casing. Each of the turbines comprises a series of radially extending turbine blades mounted on a turbine rotor and enclosed by a cylindrical or frustoconical turbine casing.

There is a remote possibility with such engines that a part, or all, of a fan or turbine blade could become detached from the remainder of the fan or turbine. In the case of a fan, such an occurrence is known as a Fan Blade Off (FBO) event and can be triggered for example by the engine ingesting a bird or other foreign body. It is a requirement of both fan and turbine casing structures that they be capable of capturing and retaining a detached fan or turbine blade, thus preventing the detached blade from causing damage to any other part of the aircraft. Containment structures are typically mounted within the external casing to perform this function. These structures may be purely metallic or made from a combination of metals and composite materials such as Kevlar®.

It is known to provide containment casings comprising solid or composite rings of material having sufficient strength to capture and restrain a detached blade. It is also known to provide a lightweight cellular structure encased between inner and outer rings of solid material. The inner ring is designed to allow penetration of a blade or blade fragment such that the kinetic energy of the blade may be absorbed through crushing of the cellular material. The outer ring is rigid to prevent further penetration of the blade following energy absorption by the cellular material. In such an arrangement, a hook is commonly provided at an axially forward end of the containment structure to act as a holding device. The hook retains the blade or blade fragment within the cellular structure, effectively containing the blade and preventing it from causing further damage.

Containment structures are also required to protect against damage by smaller debris such as impacts damage from ice fragments. Improved ice impact resistance is provided by increasing the stiffness of the cellular structure. However, a stiff cellular structure can inhibit blade penetration through the cellular material, preventing a blade from completely engaging with the hook and thus reducing the effectiveness of the blade containment.

In all containment structures for aircraft applications, weight is a crucial factor in component design; it is desirable to reduce the weight of the containment casing as much as possible According to the present invention there is provided a containment casing comprising a radially outer layer, an intermediate energy absorbing layer, and a retention framework distributed axially and circumferentially along the casing and extending substantially radially inwardly at least partially through the intermediate energy absorbing layer.

The retention framework catches and constrains a detached blade or partial blade earlier in the containment event than the conventional hook and in a more effective manner. The retention framework thus reduces the necessary axial length of the containment casing, providing manufacturing and weight saving advantages.

The retention framework may terminate in a plurality of radially inwardly facing engagement features. These engagement features may assist in capture of a detached blade or partial blade and may also assist in directing the interaction of the retention framework with the intermediate layer.

The containment casing may further comprise a radially inner layer covering the intermediate layer. The inner layer may be relatively thin and light weight and may be metallic or may be of a composite structure.

The retention framework may terminate in the engagement features close to a surface of the intermediate layer, immediately adjacent the inner layer. The engagement features may thus rest just below the gas washed surface of the inner layer, ready to engage with the inner layer and with a detached blade as soon as contact is made.

The inner layer may comprise perforations operable to initiate preferential folding, creasing or tearing in the inner layer. Such perforations may help to control and focus regions of crushing of the intermediate layer during a FBO event.

The intermediate layer may comprise a honeycomb structure, which may for example be a Nomex® honeycomb structure.

The intermediate layer may exhibit orthotropic crush properties. Such properties help to control the interaction of the intermediate layer with the retention framework, so as to increase the efficiency of energy absorption by the intermediate layer during a FBO event.

The retention framework may be integrally formed with the outer layer, thus increasing the rigidity of the retention framework.

The retention framework may be constrained or supported by the intermediate layer. The intermediate layer may provide all structural support for the retention framework, increasing the range of available interaction between the retention framework and the intermediate layer.

The retention framework may comprise a network of substantially radially extending posts. Each post may be a discrete element, independently held within the framework by the intermediate layer. Alternatively, each post may be integrally formed with or otherwise connected to the outer layer of the casing.

The retention framework may comprise a plurality of axially spaced annular rings.

The retention framework may comprise a plurality of circumferentially spaced axial ribs.

The retention framework may comprise a helical rib extending axially along the casing.

The engagement features may comprise protrusions that taper radially inwardly. The engagement features may for example be pointed. In the case of a retention structure comprising posts, the engagement features may comprise the pointed ends of the posts. The ends may be circumferentially pointed to form a cone shape, may be pointed on three or four sides to form a triangular or pyramid shape, or may be pointed or tapered in other ways.

In the case of a retention structure comprising rings or ribs, the engagement features may comprise tapered or pointed protrusions individually protruding from a radially inner surface of the ring or rib at spaced intervals. The protrusions may be circumferentially pointed to form a cone shape, may be pointed on three or four sides to form a triangular or pyramid shape, or may be pointed in a plane, for example in or against the plane of the ring or rib. The engagement features may comprise series of adjacent protrusions for example in the form of a toothed row.

Alternatively, the engagement features may be rounded or elliptical.

The retention framework may extend substantially normally to the outer layer of the casing.

The retention framework may be angled with respect to the normal of the outer layer of the casing. The retention framework may be angled forward with respect to the gas flow through the casing, allowing a detached blade to meet the framework at approximately 90 degrees. Alternatively, the retention framework may be angled backward with respect to the gas flow through the casing, allowing a detached blade to meet the framework in approximately parallel orientation.

For a better understanding of the present invention, and to show more clearly how it may be brought into effect, reference will now be made, by way of example, to the following drawings in which:—

Figure 1:
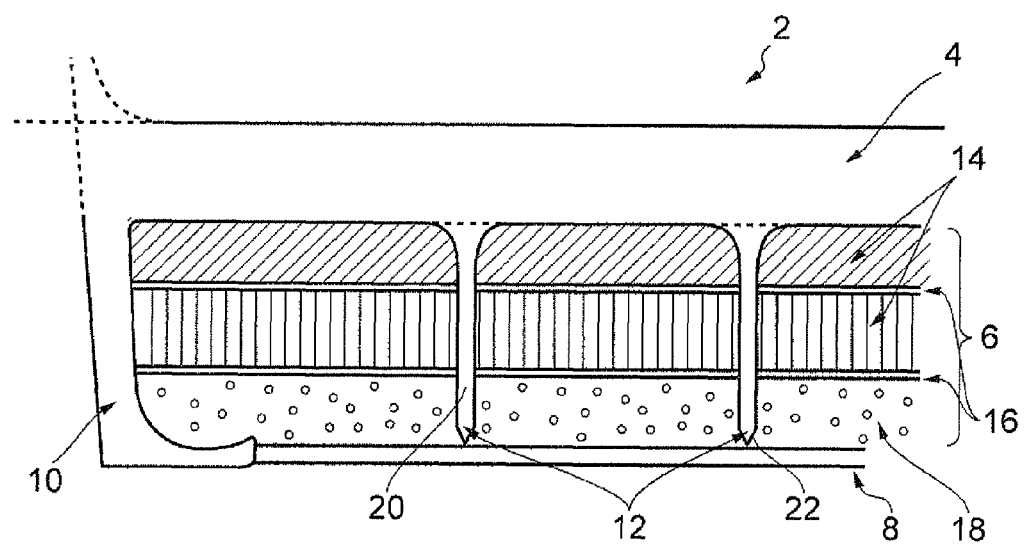
FIG. 1 is a sectional view of a containment casing.

With reference to FIG. 1, a substantially cylindrical containment casing 2 for a fan of a gas turbine engine comprises a radially outer layer 4, an intermediate energy absorbing layer 6 and a radially inner layer 8. An annular hook 10 extends radially inwardly from a first axial end of the casing and a retention framework 12 extends radially inwardly through the intermediate layer 6.

The radially outer layer 4 of the casing forms the main structure of the casing, imparting form and rigidity to the casing. The outer layer 4 may be made of a metal, for example an aerospace alloy such as Titanium, Aluminium or Steel, or it may be made of a composite component formed from reinforcement fibres embedded in an organic resin matrix. Alternatively, the outer layer maybe made from a metal with composite reinforcement, or a Kelvar® winding.

The intermediate energy absorbing layer 6 is formed from a series of discrete layers, each having an energy absorbing function. In this embodiment two cellular layers 14 are mounted radially inwardly of the outer layer, with a separating layer 16 sandwiched between them, (In other embodiments, different numbers of layers may be used.) The cellular layers 14 may be formed from a metallic honeycomb material or from a foam or other energy absorbing material. The cellular layers 14 may be of the same or of differing stiffness. A further separating layer 16 is mounted on a radially inner surface of the cellular layers 14. The separating layers 16 are comparatively thin and may be formed from the same or from different materials. A honeycomb layer 18, which may be a Nomex® honeycomb layer, is mounted on a radially inner surface of the second separating layer 16 and the radially inner layer 8 of the casing 2 is mounted on the honeycomb layer 18.

The radially inner layer 8 is also comparatively thin and may be of a similar structure to the separating layers 16. Each of these layers may be formed from an aerospace alloy or may be formed fully or partially from organic matrix composite material. Such composite material may include glass, carbon, Keviar or other fibre types. The matrix material may be epoxy or other organic resin commonly applied in the composites industry and capable of withstanding temperatures in the range associated with compressor fan containment. The fibre and matrix combination may be in the form of a laminate of multiple layers of woven or unidirectional cloth. The combination may be formed by filament winding, by braiding, by a tape laying process, or by any other well known methods. The laminate may be formed together with metallic interleaved layers such as in the known materials TiGr (Titanium and Graphite fibre) or GLARE® (glass fibre and Aluminium).

Both the separating layers 16 and the radially inner layer 8 may include perforations at specific locations to facilitate and direct tearing of the separating layers 16 or the radially inner layer 8 during a fan blade off (FBO) event.

The hook 10 may be integrally formed with the outer layer 4 and extends radially inwardly in an annular ring, the width of the intermediate layer 6. At the level of the radially inner layer, the hook curves at approximately 90 degrees to extend axially a short distance. Conventionally, the hook is of the same metallic alloy as the outer layer 4. However, the hook may be formed from a composite material or from a combination of metallic and composite materials. The hook 10 may be employed in combination with the retention framework 12, as illustrated in FIG. 1, or may be constructed as a special case of elements of the retention framework 12, as described below.

It will be appreciated that variations to the structure described above are contemplated within the scope of the present invention. For example, the cellular layers 14 may be similar or identical in construction to the honeycomb layer 18. Aerospace alloys, other metallic materials and composite materials may be used in the various structures described above as appropriate to the specific application in which the casing will be employed.

As illustrated in FIG. 1, the retention framework 12 comprises a network of posts 20 that extend radially inwardly from the outer layer 4 to the radially inner surface of the intermediate layer 6. The posts may be formed from any appropriate metallic or composite material. FIG. 1 shows the posts 20 as being formed integrally with the outer layer 4 but the posts 20 may also be formed from a different material to the outer layer 4 and joined to the outer layer 4 by welding, bolts, glue or any other appropriate method. In a preferred embodiment, the posts 20 are not structurally joined to the outer layer 4 at all but are wholly supported by the intermediate layer 6. The intermediate layer 6 must therefore be of sufficient stiffness to provide location and structural support for the posts 20 of the retention framework 12.

The individual posts 20 of the retention framework 12 each terminate in an engagement feature 22. In the embodiment illustrated in FIG. 1, the engagement features 22 comprise protrusions that taper to a point. The protrusions may taper circumferentially to form a cone shape as at the tip of a pencil, or the protrusions may taper on one, two, three or four sides thus presenting various angled faces to the inner layer 8 immediately adjacent the ends of the protrusions.

Figure 2:
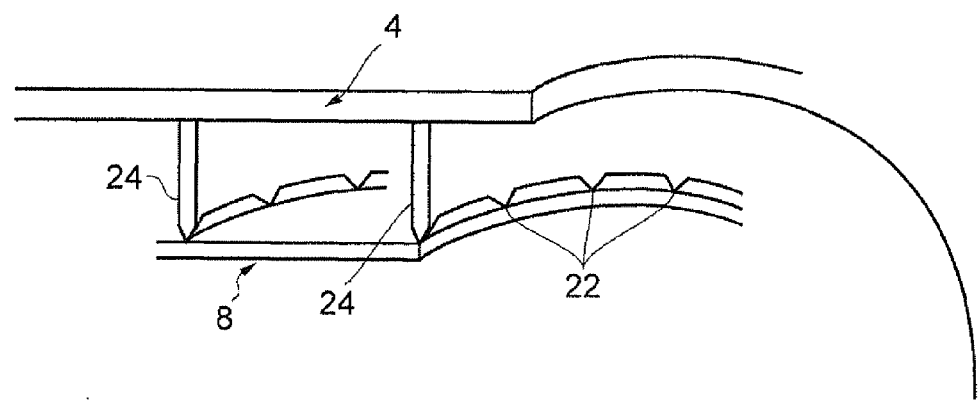
FIG. 2 is a partial perspective view of an alternative containment casing.
Figure 3:
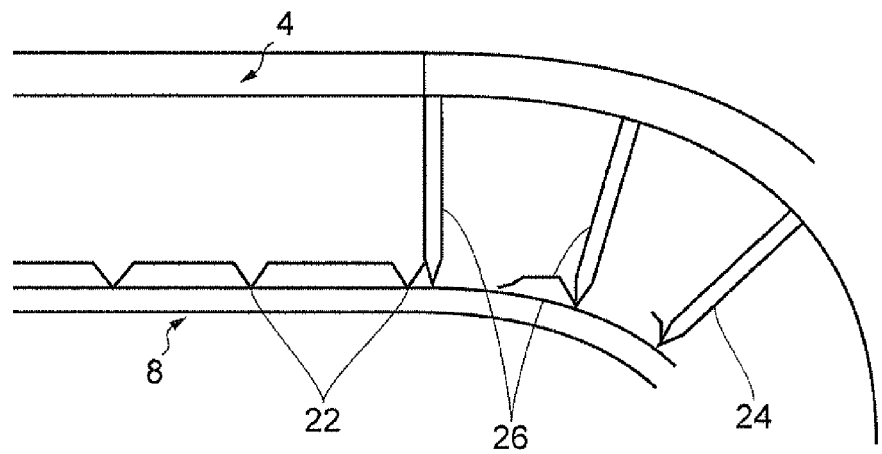
FIG. 3 is a partial perspective view of another alternative containment casing.

The retention framework 12 may take other forms, as illustrated in FIGS. 2 and 3. With reference to FIG. 2, the retention framework may be in the form of annular circumferential rings 24 that are axially spaced along the casing 2. In this case, the hook 10 may be a special case of the rings 24 of the retention framework 12. Alternatively, as illustrated in FIG. 3, the retention framework 12 may take the form of a series of axially extending ribs 26, circumferentially spaced around the casing 2. In a further alternative configuration (not shown) the retention framework may take the form of single or multiple helically extending ribs. The ribs take the form of a helix that spirals axially along the casing.

Figure 6A:
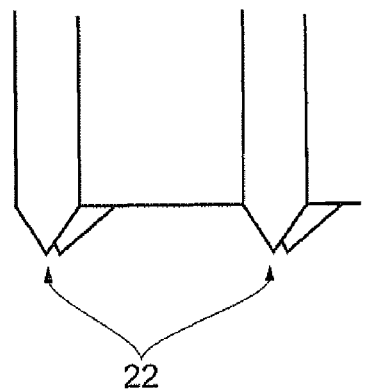
FIGS. 6a to 6c are partial sectional views of alternative engagement features.
Figure 6B:
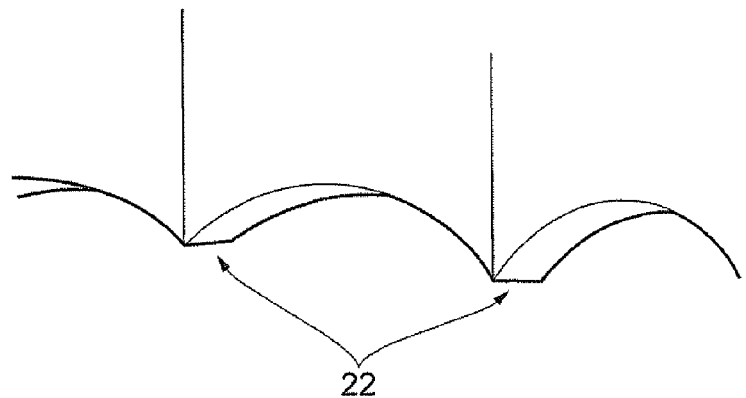
Figure 6C:
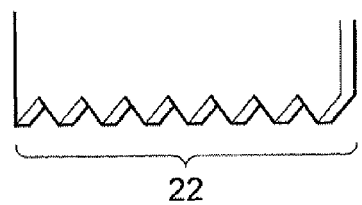

In the case of these alternative formulations for the retention framework, the engagement features may take the form of discrete protrusions spaced along the radially inner edge of the rings 24 or ribs 26 as illustrated in FIGS. 2 and 3. The protrusions may be triangular or may by pyramid shaped, according to the number of sides on which they are tapered. FIG. 6*a* illustrates engagement features 22 in the form of pyramid shaped protrusions. FIGS. 6*b* and 6*c* illustrate additional alternative configurations for the engagement features 22, including reverse arches and a saw tooth configuration.

Figure 4A:
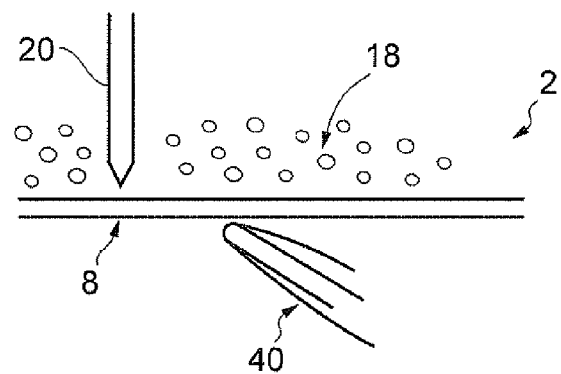
FIGS. 4a to 4c are partial sectional views of an aerofoil blade entering a containment casing during use.

Operation of the containment casing 2 is described below with reference to FIGS. 4*a* to 4*c*.

It will be appreciated that the function of the retention framework 12 of the casing 2 is to contain aerofoil blades and blade fragments in the event of full or partial blade release. FIG. 4*a* illustrates a blade 40 approaching the containment casing 2 from below. An inner end of a single post 20 of the retention framework 12 is illustrated supported in the honeycomb layer 18 of the intermediate layer 6. The post 20 is held in position by the surrounding honeycomb material. The honeycomb material, which may for example be Nomex® honeycomb, behaves elastically for very modest loads but transitions to crush like behaviour with progressing crush displacement at near constant applied force. The material is generally (although not necessarily) orthotropic, exhibiting different stiffness along the plane of the material to that in the through-thickness direction. The material may also exhibit different stiffness in differing orientations within the plane of the material.

Figure 4B:
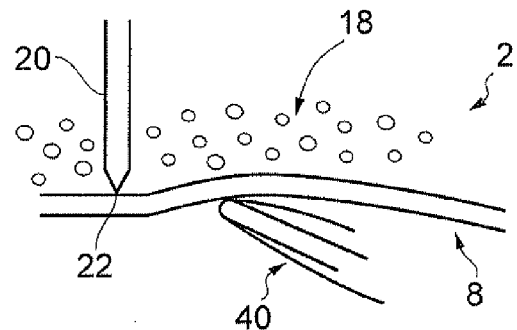

FIG. 4*b* illustrates the point at which the blade 40 begins to engage with the inner layer 8 of the containment casing 2. The softer material of the honeycomb layer 18 behind the inner layer 8 begins to crush under the force of the approaching blade 40. The inner layer 8 bends radially outwards, and the engagement feature 22 of the post 20 begins to penetrate the inner layer 8. Penetration of the engagement feature 22 may be eased by the presence of perforations in the layer 8. Folding, creasing and/or tearing the inner layer surface may also be seeded by the presence of perforations in the liner layer 8. Such perforations thus assist in controlling and focusing the regions of crushing. Crushing the material of the honeycomb layer 18 in the through-thickness direction causes it to become stiffer and more resistant in the in-plane direction. This increase in in-plane stiffness and resistance in turn causes the material of the honeycomb layer 18 to grip the post 20 and hold it in place. Once the post 20 is gripped by the crushed material, it becomes a much stiffer structure, able to resist blade impact and to absorb blade kinetic energy to far greater effect than without such support.

Figure 4C:
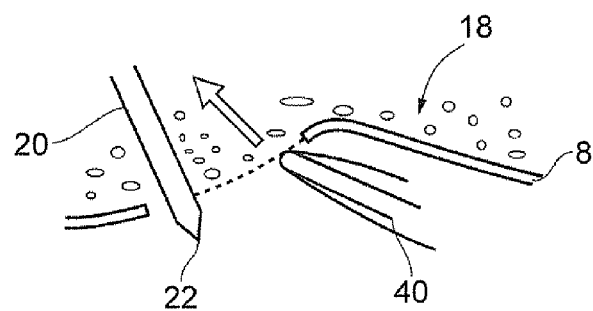

FIG. 4*c* illustrates the effect of continued penetration of the blade 40 into the containment liner 2. The post 20 is wedged in place by crushed material of the honeycomb layer 18, and by the action of crushed and disturbed material further outward in the intermediate layer 6 (not shown). The blade 40 pushes against the wedged post 20. In this manner, the load of the blade 40 is transmitted though the post 20, against the in-plane resistance of the spongy material (which is now stiffer in the in-plane direction following through-thickness crushing, as detailed above). The blade 40 is thus forced to ride up the side of the post 20 towards the outer casing layers, rather than move forward towards the front of the casing (towards the left of the Figures). The blade 40 may be able to penetrate the post 20, and will move forwards until it meets the next post 20, or the hook 10. The post 20 may yield gradually to form a hook shape, further entangling the blade 40, or it may yield cleanly. The same process takes place until the kinetic energy of the blade 40 is completely absorbed and the blade is firmly retained in the casing structure. The design of the individual posts 20 in the network that forms the retention structure 12 may vary along the axial length of the casing to allow for the differing modes of engagement that will be experienced by posts in different axial relation to the blades they are to contain.

It will be appreciated that a retention framework 12 comprising circumferential rings 24 or axial or helical ribs 26 operates in a substantially similar manner to the retention framework 12 of posts 20 described above. In all cases, the action of the retention framework 12 is to re-direct the motion of the blade 40 from the axial direction towards the radial direction, and also to reduce the speed and hence kinetic energy of the blade.

Figure 5A:
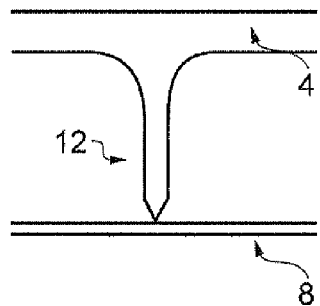
FIGS. 5a to 5d are partial sectional views of alternative retention frameworks.
Figure 5B:
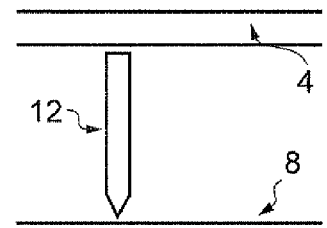

As noted above, the retention framework 12 may be integrally formed with the outer layer 4 or it may be supported solely by the intermediate layer 6. FIG. 5*a* illustrates a part of a retention framework 12 which is integral with the outer layer 4 of the casing 2. This would preferably be a metallic retention framework 12, formed as part of the containment casing forging, and machined away, or separately fabricated and welded into position. It could alternatively be of another material (including composite) and be bolted or glued into position. FIG. 5*b*, illustrates a part of a retention framework 12 which is supported only by the intermediate layer 6 (not shown). The retention framework 12 may be lightly fixed in place for convenience of manufacture, but the fixing plays little or no part in the structural role of the retention framework 12.

The retention framework 12 is illustrated in FIGS. 1 to 4 as extending radially substantially normally to the outer layer 4 of the containment casing 2. In alternative embodiments the retention framework 12 may be angled with respect to the normal, forwards into the gas flow (towards the left in the figures) or backwards away from the gas flow (to the right in the Figures).

Figure 5C:
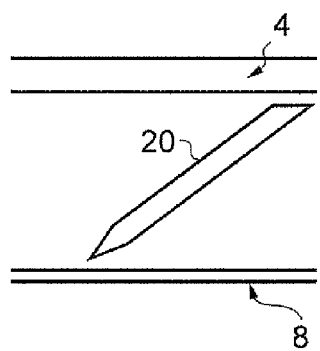

FIG. 5*c* illustrates a retention framework element 20 that is inclined at a forward angle. An approaching blade meets the framework element 20 at approaching a right angle, and the framework element 20 is pressed diagonally backwards into the material of the intermediate layer 6. The effect of the orthotropic crush properties of the material is that the element 20 bends/rotates at the point of the blade contact following the material crush direction preference. If the though-thickness direction is stiffer (the usual situation for a honeycomb layer) then the element 20 rotates towards the vertical. The blade then drags the element 20 through the material of the intermediate layer 20 in the axial direction until the element 20 completely swings around. In this manner, the maximum kinetic energy is extracted from the blade while crushing the minimum of spongy material. The effectiveness of the energy absorption can be further increased by the presence of viscoelastic material filler or resin in the cells of a honeycomb structure. The forward angled configuration of FIG. 5*c* is employed to best effect when the retention framework 12 is not directly connected to the outer layer 4 of the containment casing 2. The engagement features 22 may not come into play with a forward angled configuration. If the engagement features are employed, they generally serve to grip the inner layer 8 during the rotation and reduce axial motion.

Figure 5D:
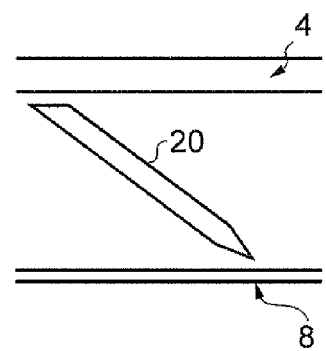

FIG. 5*d* illustrates a retention framework element 20 that is inclined at a backward angle. An approaching blade meets the element 20 in a nearly parallel orientation, and the action of the blade/element is to crush material towards the inner layer 4. The blade is then pushed directly into the containment casing and becomes wedged under the base of the element near to the outer layer 4. The backward angled configuration of FIG. 5*d* is employed to best effect with a relatively stiff honeycomb material in the honeycomb layer 18, adjacent the inner layer 8. Stiffness required in this layer for ice impact resistance can be a problem for containment but this configuration of the present invention enables the stiffness of this layer to be used in an effective manner to increase containment effectiveness. The combined stiffness of the inner layer 8 and honeycomb layer 18, with the retention framework elements effectively forming a further sheet radially outside the honeycomb layer 18, becomes like a stiffened honeycomb panel, and actively drives the blade into the casing. In this configuration, the primary action of the engagement features is to lock into the inner layer and hold the retention framework 12 in place.

The mechanism by which the retention framework 12 is designed to operate determines to some degree to the nature of the engagement features 22 that are required. If one of the goals is to strip the metallic coating off a composite blade, then sharpness is of primary concern. In one embodiment, the engagement features 22 comprise a combination of taller protrusions to penetrate the inner layer 4 and shorter ones to grind at the blade surface. Grinding or shredding the blade surface assists in breaking a composite blade into smaller, more easily contained pieces.

It will be appreciated that the present invention provides a containment casing in which blade containment is achieved earlier in an aerofoil blade-off event than the in the present systems. A detached blade is caught more quickly and effectively, thus reducing the necessary axial length and hence the weight of the containment casing. In addition, the retention framework of the present invention makes more effective use of the energy absorbing properties of the intermediate layer of a containment casing, thus absorbing kinetic energy of a detached blade more efficiently, again reducing necessary weight.

The present invention has been described with reference to a fan blade casing for a gas turbine engine but it will be understood that the present invention finds application also in turbine casings and in many other types of rotary machinery, for example in industrial radial compressors.

The invention claimed is:

1. A containment casing for containing a blade or a blade fragment of a gas turbine engine, the containment casing comprising:
    a radially outer layer;
    a radially inner layer;
    an intermediate energy absorbing layer disposed between the radially outer layer and the radially inner layer; and
    a retention framework disposed axially and circumferentially along the containment casing and extending substantially radially inwardly through the intermediate energy absorbing layer, the retention framework terminating in a plurality of radially inwardly facing engagement features, the inwardly facing engagement features are located immediately adjacent to the inner layer and taper radially inwardly in a direction oriented towards a surface of the radially inner layer; and
    at least one engagement feature penetrates through the entire thickness of the radially inner layer in response to the blade or the blade fragment impacting the containment casing.

2. The containment casing as claimed in claim 1, wherein, the radially inner layer covers the intermediate energy absorbing layer.

3. The containment casing as claimed in claim 2, wherein the inner layer comprises perforations operable to initiate preferential folding, creasing or tearing in the inner layer.

4. The containment casing as claimed in claim 1, wherein the intermediate energy absorbing layer includes a honeycomb structure.

5. The containment casing as claimed in claim 1, wherein the intermediate energy absorbing layer substantially exhibits orthotropic crush properties.

6. The containment casing as claimed in claim 1, wherein the retention framework is substantially integrally formed with the outer layer.

7. The containment casing as claimed in claim 1, wherein the retention framework is substantially constrained by the intermediate energy absorbing layer.

8. The containment casing as claimed in claim 1, wherein the retention framework includes a network of substantially radially extending posts.

9. The containment casing as claimed in claim 1, wherein the retention framework includes a plurality of axially spaced annular rings.

10. The containment casing as claimed in claim 1, wherein the retention framework includes a plurality of circumferentially spaced axial ribs.

11. The containment casing as claimed in claim 1, wherein the engagement features include protrusions that taper radially inwardly to a point oriented towards a surface of the radially inner layer.

12. The containment casing as claimed in claim 1, wherein the retention framework extends substantially normally to the outer layer of the casing.

13. The containment casing as claimed in claim 1, wherein the retention framework is angled with respect to the normal of the outer layer of the casing.

14. A gas turbine engine comprising a containment casing as claimed in claim 1.

15. The containment casing as claimed in claim 1, wherein in response to the at least one engagement feature penetrating through the entire thickness of the radially inner layer, the intermediate energy absorbing layer grips the at least one engagement feature and holds the at least one engagement feature in place.

16. The containment casing as claimed in claim 1, wherein the retention framework includes at least one elongate element extending radially inwardly from the outer layer and terminating in a tapered engagement feature.

17. A containment casing for containing a blade or a blade fragment of a gas turbine engine, the containment casing comprising:
    a radially outer layer;
    a radially inner layer;
    an intermediate energy absorbing layer disposed between the radially outer layer and the radially inner layer; and
    a retention framework disposed axially and circumferentially along the containment casing and extending substantially radially inwardly through the intermediate energy absorbing layer, the retention framework terminating in a plurality of radially inwardly facing engagement features, the retention framework being configured such that at least one engagement feature penetrates through the entire thickness of the radially inner layer in response to the blade or the blade fragment impacting the containment casing,
    wherein the retention framework includes a helical rib extending axially along the casing.

* * * * *